May 12, 1959
W. C. GRESHAM ET AL
2,886,772
APPARATUS FOR MAGNETIC INSPECTION
Filed April 12, 1954
7 Sheets-Sheet 1
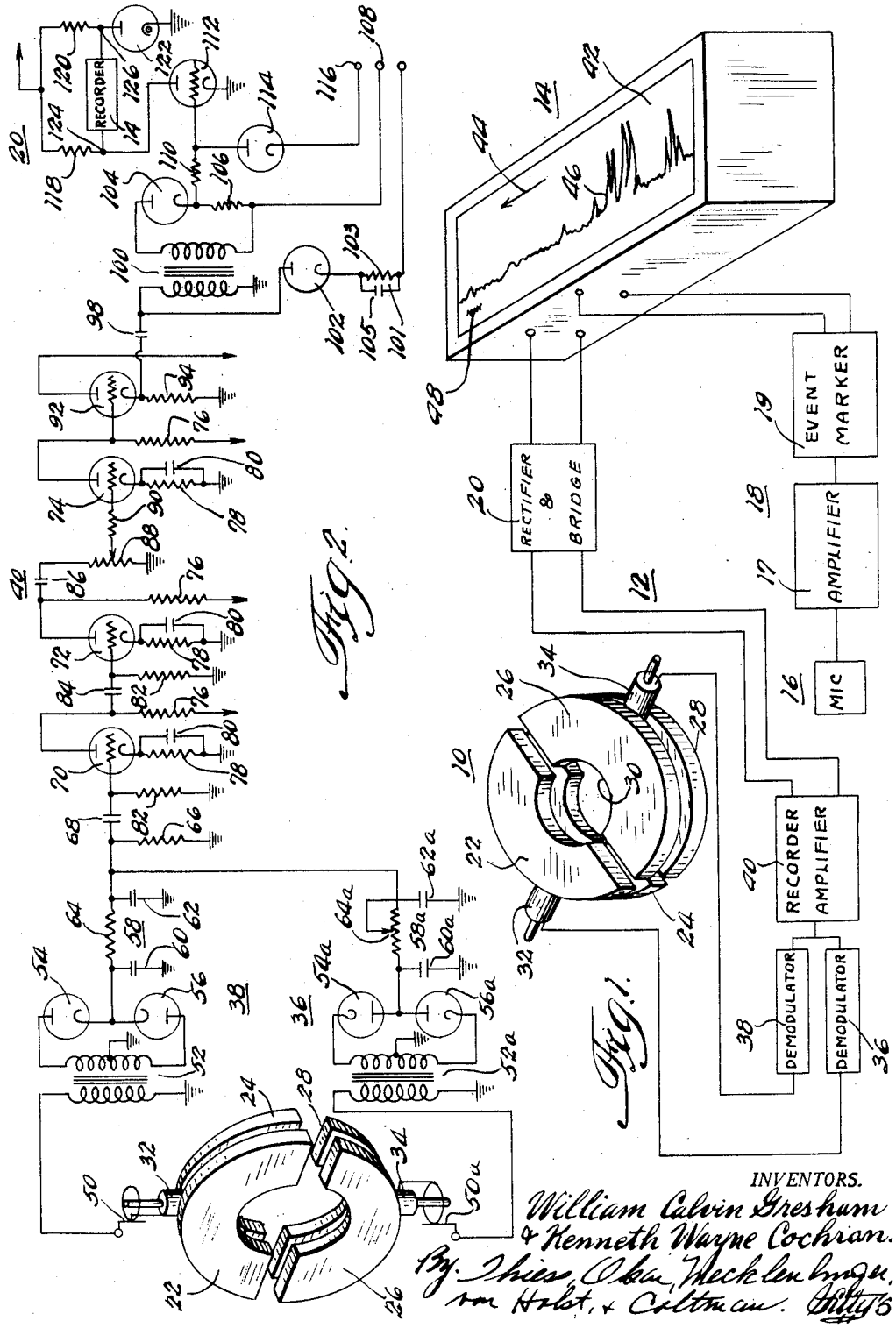
INVENTORS.
William Calvin Gresham
& Kenneth Wayne Cochran.

May 12, 1959  W. C. GRESHAM ET AL  2,886,772
APPARATUS FOR MAGNETIC INSPECTION
Filed April 12, 1954  7 Sheets-Sheet 2
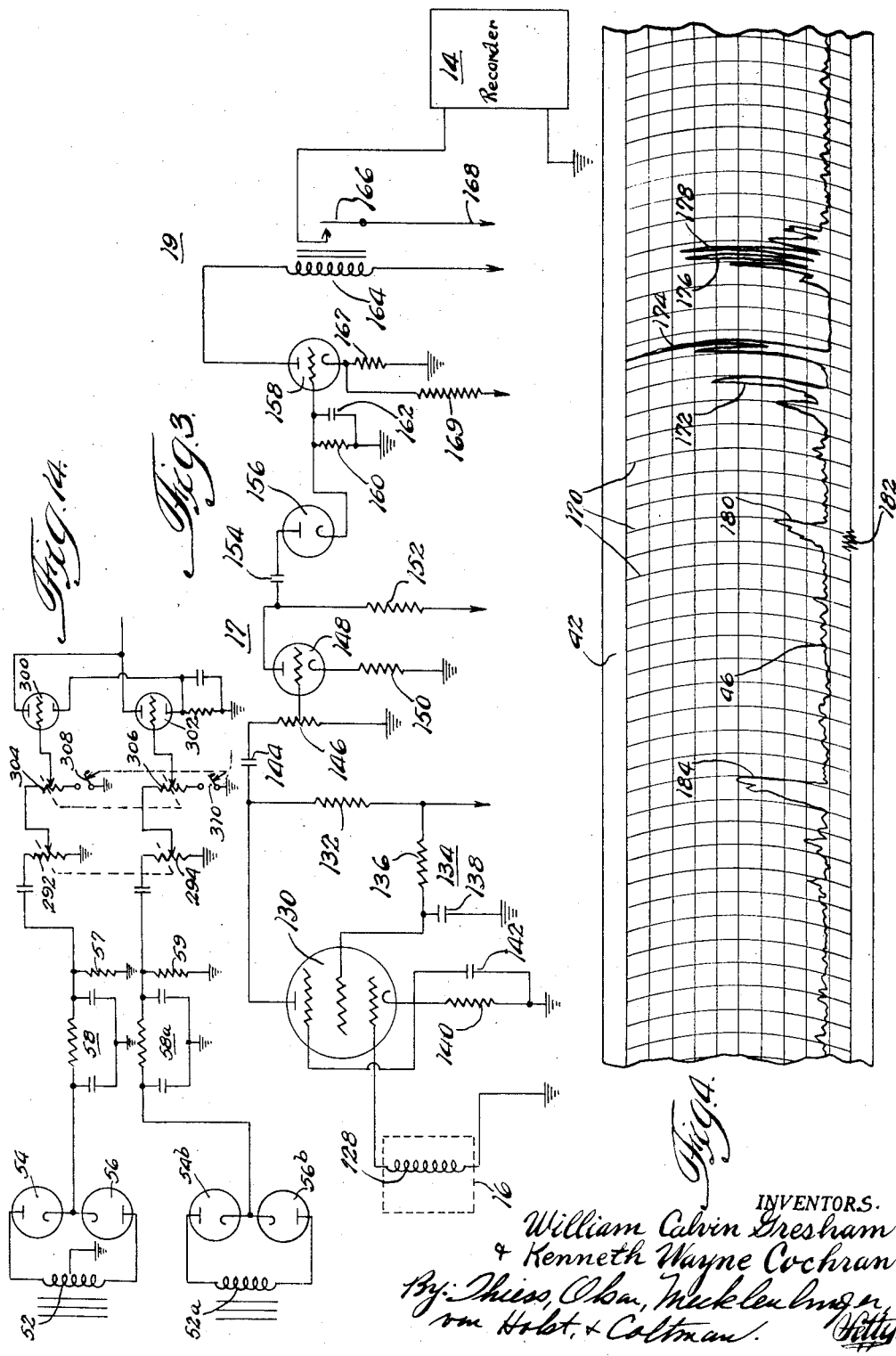

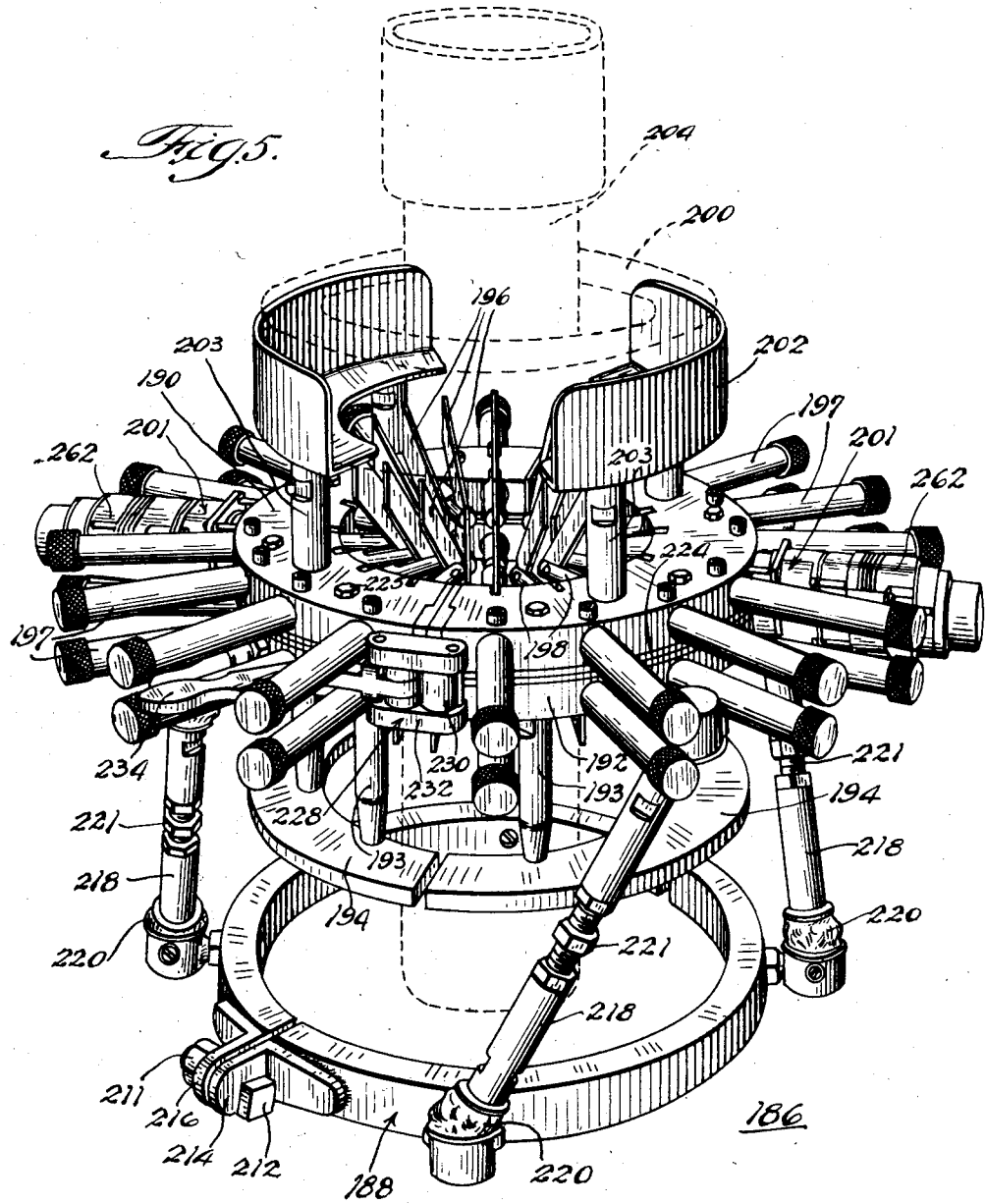

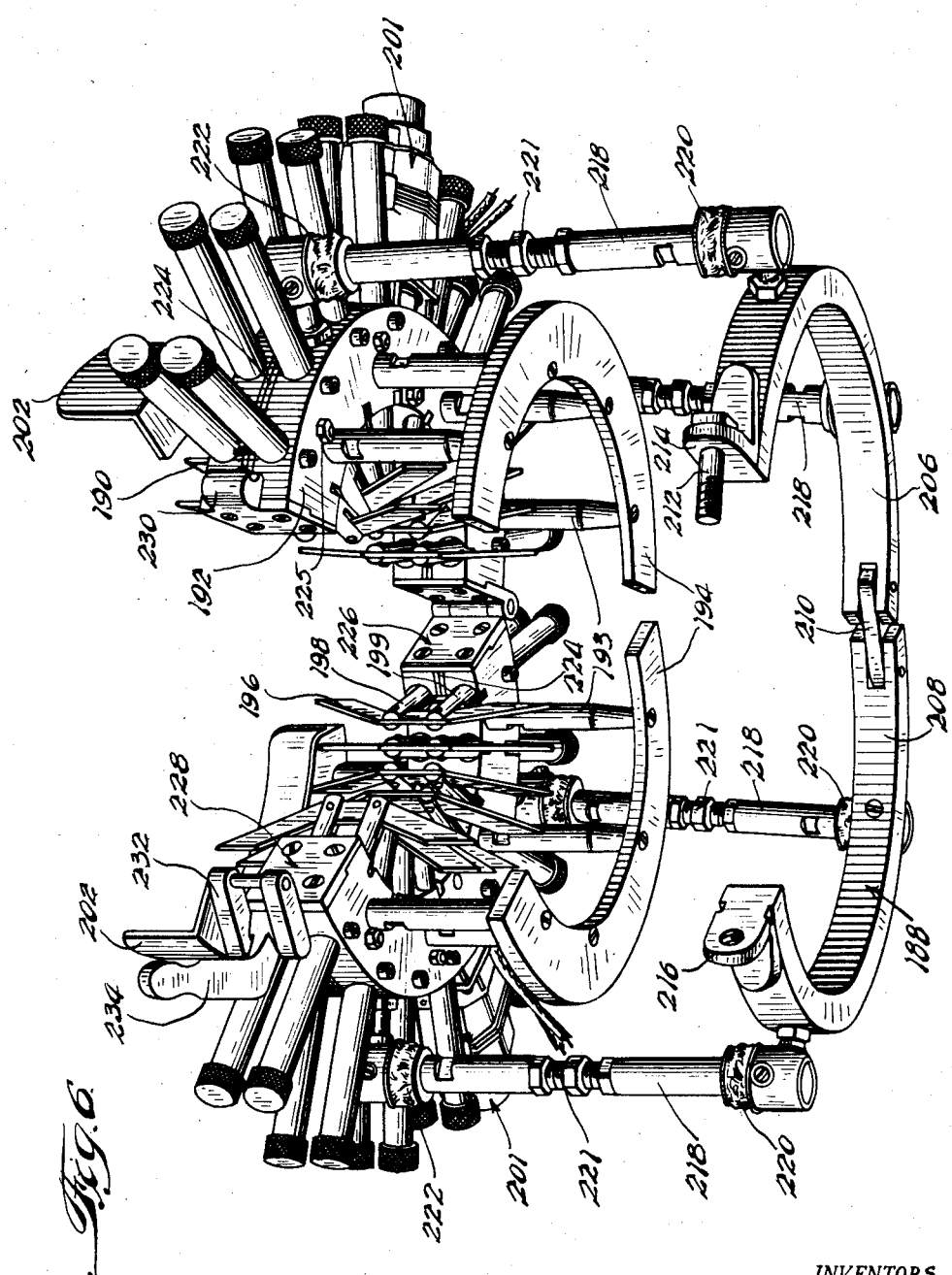

May 12, 1959 W. C. GRESHAM ET AL 2,886,772
APPARATUS FOR MAGNETIC INSPECTION
Filed April 12, 1954 7 Sheets-Sheet 5
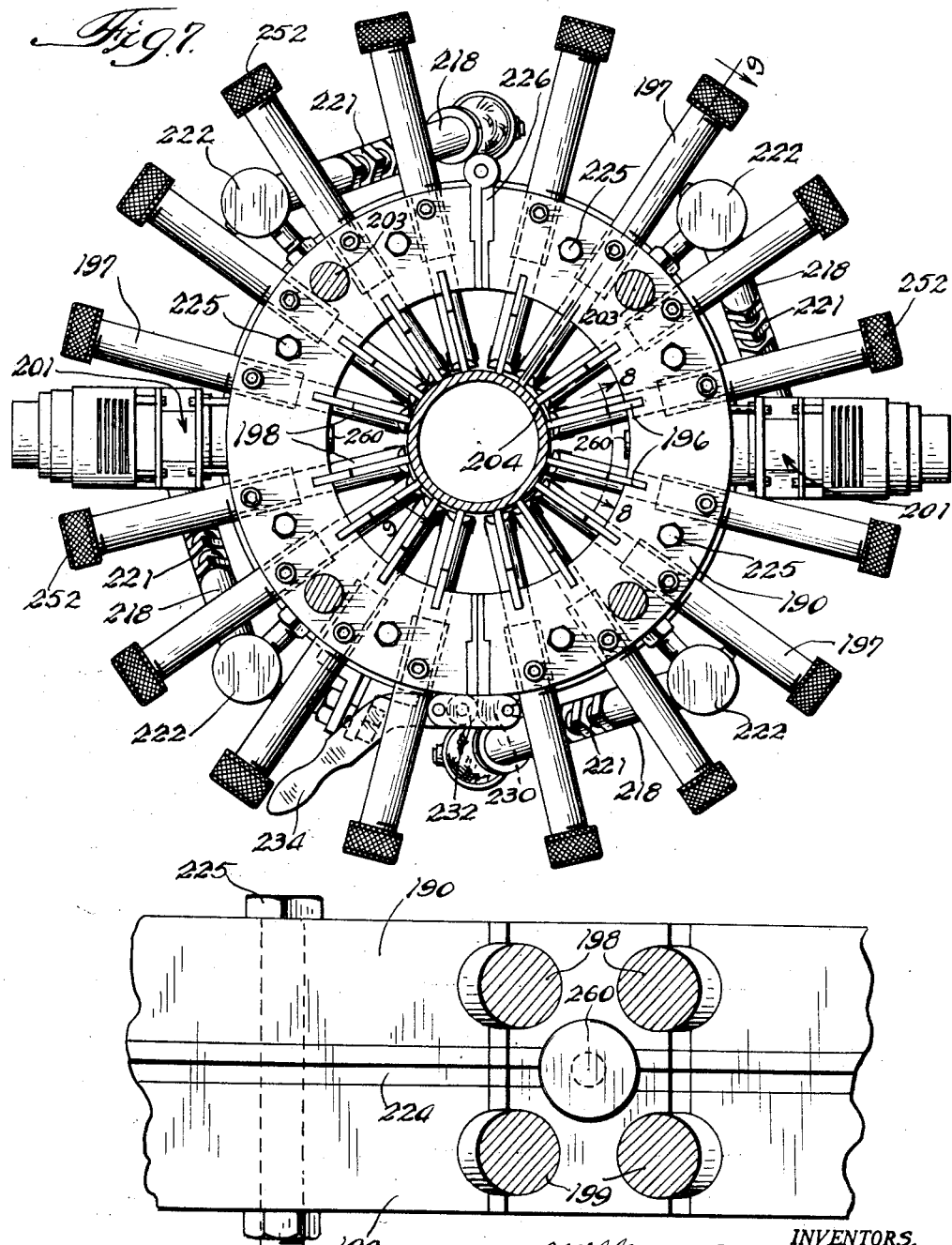
INVENTORS.
William Calvin Gresham
& Kenneth Wayne Cochran

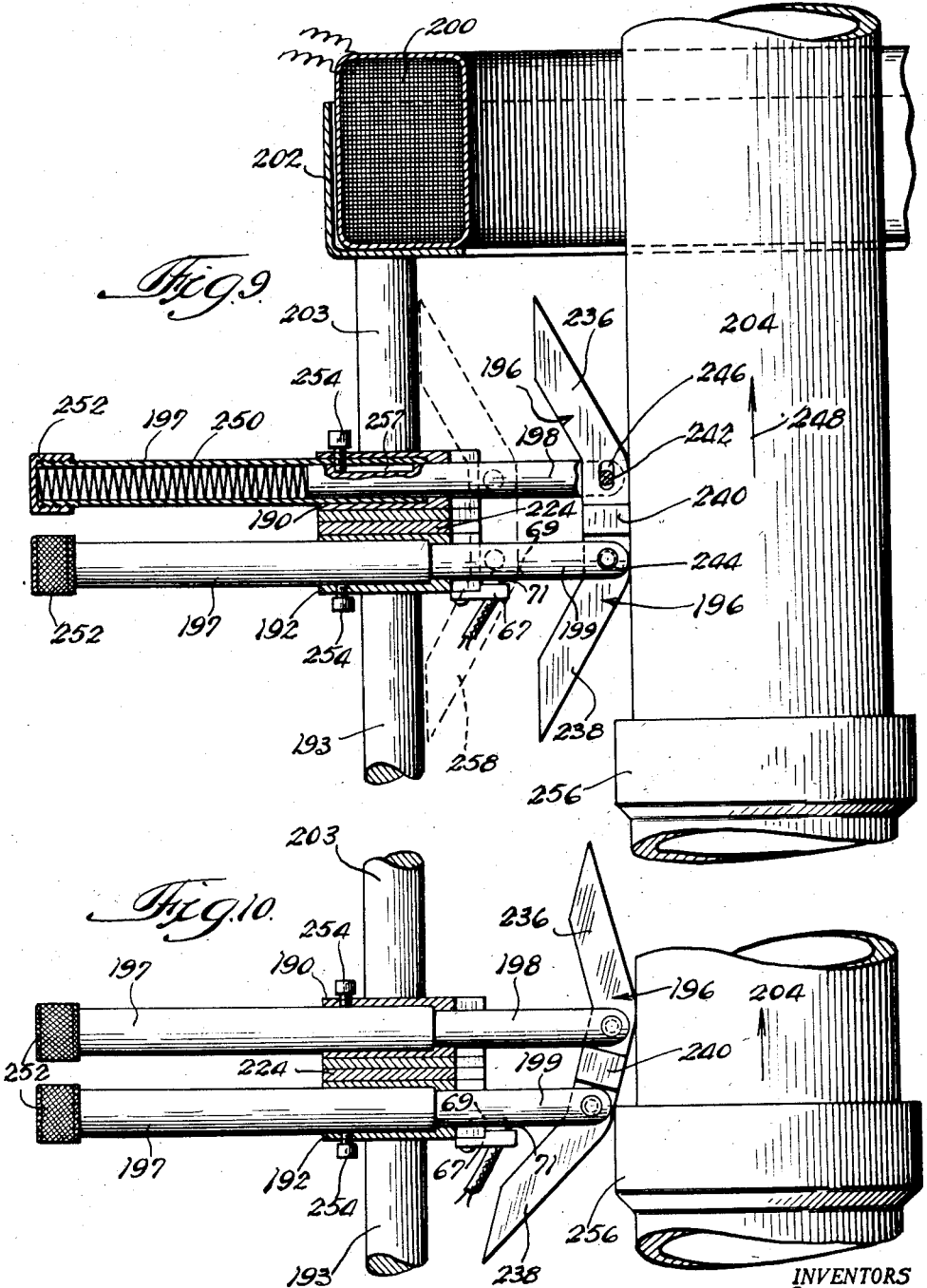

May 12, 1959 W. C. GRESHAM ET AL 2,886,772
APPARATUS FOR MAGNETIC INSPECTION
Filed April 12, 1954 7 Sheets-Sheet 7
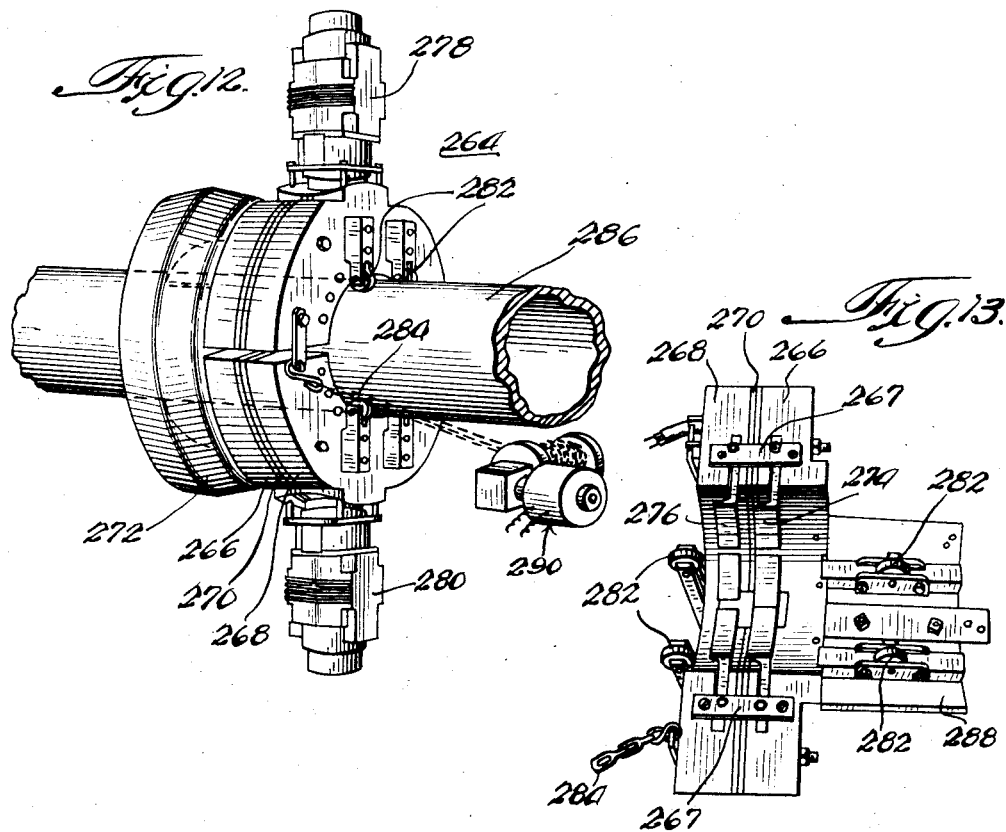
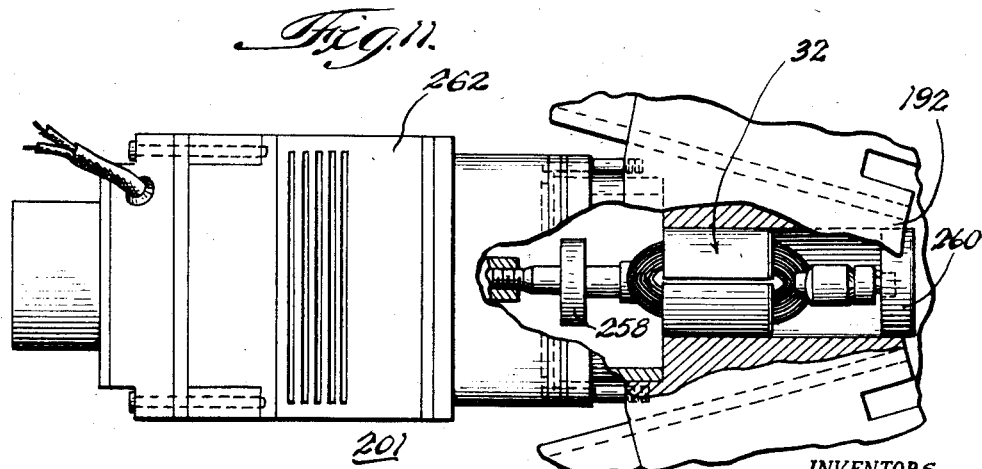
INVENTORS.
William Calvin Gresham
& Kenneth Wayne Cochran.
By: Thiess, Olsen, Mecklenburger,
van Holst, & Coltman.
ATTYS.

United States Patent Office 2,886,772
Patented May 12, 1959

2,886,772

APPARATUS FOR MAGNETIC INSPECTION

William Calvin Gresham and Kenneth Wayne Cochran, Oklahoma City, Okla., assignors, by mesne assignments, to Atlas Pipe, Inc., Houston, Tex., a corporation of Texas Application April 12, 1954, Serial No. 422,376

13 Claims. (Cl. 324—37)

This invention relates to an improved method and apparatus for magnetic inspection and testing and more particularly to a method of and apparatus for detecting flaws and discontinuities in articles of manufacture composed of magnetic materials.

It is an important object of this invention to provide improved magnetic testing apparatus capable of generating a constant flux in a specimen under test and of conveniently and accurately determining the pattern of such flux in the specimen.

The prior art is replete with various teachings of methods and apparatus for performing magnetic tests. Many physical characteristics of a specimen may be studied by the observance of magnetic flux patterns therein and the flux densities in particular portions of the specimen. For example, the permeability of the material, the cross sectional dimensions of the specimen, holes, fractures, and surface discontinuities in the specimen will all manifest themselves as changes in the magnetic character of the specimen. The prior methods of magnetic testing have generally had certain inadequacies and detrimental features in common. Some of the prior art devices have employed an alternating flux source for magnetizing a specimen and this results in spurious magnetic fields, substantial energy losses in the specimen, mechanical vibration of the specimen and low sensitivity. Other systems utilizing a direct current source of magnetic flux have been known but have generally required relative motion between the specimen and the testing apparatus to generate a signal by the cutting of flux lines. All of the prior art systems have been affected by variables other than the magnetic qualities and character of the specimen under test. Other variables have included the speed with which the specimen was moved relative to the testing apparatus and the air gap between the specimen and the testing apparatus.

It is therefore a further object of this invention to provide an improved method and apparatus for testing magnetic materials which are insensitive to relative motion between the sensing apparatus and the specimen and will function satisfactorily on the specimen which is moved relative to the sensing apparatus or transducer in a random manner.

It is a further object of this invention to provide improved magnetic inspection apparatus utilizing a source of substantially constant magnetic flux which will exhibit relatively low energy losses and will not cause objectionable spurious signals in the testing area.

It is another object of this invention to provide an improved method and apparatus for testing magnetic materials which utilizes an alternating current signal bearing a known relationship to the variable being measured and generated by a device which is located remotely from the specimen under test.

It is still a further object of this invention to provide improved apparatus for magnetic testing which generates a voltage proportional to the magnetic character of a particular portion of a specimen under consideration.

It is a further object of this invention to provide improved apparatus for magnetic testing which generates a signal in the nature of an amplitude modulated carrier voltage wherein a magnetizing coil produces flux in the specimen which effectively provides a carrier and discontinuities, and variations in the magnetic character of a portion of the specimen provide the modulation products.

It is a further object of this invention to provide apparatus for making a permanent record of the condition of an elongated specimen of magnetic material.

It is another object of this invention to provide an improved transducer for use in magnetic testing apparatus which results in a closely coupled magnetic circuit providing increased sensitivity and accuracy in measuring the character of the specimen under test.

It is still another object of this invention to provide an improved transducer for magnetic testing having greatly enhanced flexibility whereby said transducer may accommodate specimens of various sizes and will follow such specimen during transverse movement thereof relative to the transducer, while maintaining intimate magnetic contact therewith.

Further and additional objects of this invention will become manifest from a consideration of this specification, the accompanying drawings and appended claims.

In one form of this invention apparatus is provided which is especially adapted for use on steel tubing of the type employed in oil well operations. The preferred embodiment of this invention is adapted for mounting at the oil well for testing the pipe or tubing as it is withdrawn from the well to determine the location of any substantial discontinuities, fractures or excessive pitting which may result in failure of the tubing in subsequent use. The apparatus of this invention comprises generally a transducer, an electronic circuit for performing certain operations and amplifying a signal from the transducer, and a recorder energized from said circuit for making a permanent record of the condition of each stand of tubing for later consideration and study.

One transducer as taught by this invention is adapted for mounting immediately adjacent the drilling nipple and beneath the drilling table of a typical rig whereby the tubing is continuously tested as it is withdrawn from the well during a normal trip. The transducer is adapted to handle tubing of varying size and to pass various enlargements such as tube joints and the like. Normally, drill pipe has an outside diameter of 4½ inches and a joint diameter of 6 inches, all of which pass readily through the transducer of this invention. The transducer is provided with a plurality of spring loaded shoes which are in continuous engagement with the tubing under test and form a part of a low reluctance magnetic circuit which is in parallel with a selected portion of the tubing at any given time. A group of said shoes terminates in each of two spaced pole pieces whereby a magnetic flux potential exists therebetween.

By providing a motor driven armature between these pole pieces, a voltage is generated in the winding of said armature having a frequency determined by the speed of rotation and having a magnitude determined by the speed of rotation, the magnetic character of a portion of the specimen immediately under the shoes, and the total flux in the specimen. The flux in the portion of the specimen under test is generated by a coil mounted in fixed spaced relationship to the transducer and therefore the total flux in that portion of the specimen remains substantially constant. The armature is rotated at a constant speed. Thus, the only variable remaining is the character of the portion of the specimen immediately under the shoes of the transducer. It is believed apparent that a change in the cross sectional dimensions of the tubing at a particular point or a small fracture or pitted area will result in a substantial alteration of the flux pattern within the specimen. This is probably a result of an effective change in the magnetic reluctance of the specimen at the point of discontinuity and will produce a substantial transverse or right angle component of flux extending radially from the pipe at the limits of the discontinuity.

As the shoes, pole pieces and armature comprise a magnetic path in parallel with this portion of the specimen, an increase in the magnetic reluctance of the portion under test because of a discontinuity will result in an increase in flux through the alternate flux path of the transducer. This will result in an increased signal output from the armature. When properly amplified and recorded such an increase in flux will indicate to an operator the location of an apparent flaw. Thus, while a direct current flux source is utilized, a detectable and useful alternate current signal is generated by the motion of an armature remotely located relative to the specimen under test.

For a more complete understanding of this invention reference will now be made to the accompanying drawings wherein:

Fig. 1 is a diagrammatic illustration of one embodiment of this invention showing the transducer, the various electronic circuits in block form and the recorder;

Fig. 2 is a circuit diagram of the circuitry of the embodiment of Fig. 1 employed in the recorder channel;

Fig. 3 illustrates the circuit employed in the embodiment of Fig. 1 in the event marker channel;

Fig. 4 is a reproduction of a portion of the record generated by the equipment of Fig. 1;

Fig. 5 is a perspective view of one transducer employing the teaching of this invention which is assembled about a specimen and ready for use;

Fig. 6 illustrates in perspective the transducer of Fig. 5 in its open position adapted for application to a specimen;

Fig. 7 is a plan view of the embodiment of Fig. 5;

Fig. 8 is a partial sectional view of the embodiment of Fig. 5 taken along the line 8—8 of Fig. 7;

Fig. 9 is a partial sectional view of the embodiment of Fig. 5 taken along the line 9—9 of Fig 7;

Fig. 10 illustrates the portion of the transducer shown in Fig. 9 under conditions where a joint in the specimen is encountered;

Fig. 11 is an illustration of a portion of the transducer of Fig. 5 showing the signal generator armature and its mounting in the pole pieces;

Fig. 12 illustrates an alternate embodiment of this invention utilizing a transducer adapted for movement along a stationary specimen;

Fig. 13 illustrates a portion of the embodiment of Fig. 12 showing the specimen engaging portions thereof; and Fig. 14 illustrates an alternate input circuit from the transducers to the amplifier.

Referring now to the drawings and more particularly to Fig. 1 the apparatus of this invention comprises generally a transducer 10 diagrammatically illustrated energizing a circuit 12, the output of which produces a continuous visible effect in a recorder 14. A second input to the recorder 14 is provided by a microphone 16 which energizes a circuit 18 to produce an intermittent visible effect therein.

The transducer 10 consists generally of two pairs of semiannular pole pieces 22, 24 and 26, 28. The specimen under test will be passed through the central aperture 30 in these pole pieces and will have a constant total flux present therein generated by a source coil not shown in Fig. 1. An armature 32 is rotatably mounted between the pole pieces 22 and 24, and a similar armature 34 is rotatably mounted between the pole pieces 26 and 28. As the pole piece 22, armature 32 and pole piece 24 constitute a magnetic path in parallel with a portion of the specimen lying between the pole pieces, a certain proportion of the flux normally in the specimen will pass through this alternate path. The exact proportion of flux present in the pole pieces and armature will depend upon the transverse flux determined by the character of the portion of the specimen in the gap. The armatures 32 and 34 will be rotated at a relatively high rate of speed whereby a signal will be generated having a frequency of several hundred cycles. While it is preferable that the two armatures be rotated at substantially the same speed the circuitry of this invention does not rely upon the frequency characteristics of these two generators. The output signals of the armatures 32 and 34 are applied to independent demodulators 36 and 38, the outputs thereof being compared to generate a voltage proportional to the difference between the demodulated outputs. Thus, if a discontinuity or other magnetic effect in the specimen under test appears to both of the armatures, the signal will be effectively cancelled, producing no substantial effect in the record. If, for example, the system is accurately and carefully balanced and a pipe joint is encountered or a uniform change in the magnetic permeability of the specimen occurs, the net output of the demodulators will remain substantially constant.

The output of demodulators 36 and 38 is applied to a recorder amplifier 40 which increases the magnitude of the signals substantially and applies the amplified signal to a rectifier and bridge circuit 20 which produces a variable D.C. signal to energize direct writing recorder 14. The recorder 14 may be any one of a plurality of commercially available direct writing recorders capable of operation from a source of direct voltage which is proportional to the variable to be measured.

Shocks and mechanical disturbances occurring in the specimen will cause an instantaneous reorientation of the magnetic domains of the specimen and consequently may produce a signal in the apparatus of this invention. To prevent any misleading impressions from a signal resulting from such a shock or stress phenomena an event marking circuit is provided. A microphone 16 is mounted on the drilling table or in any position where it will register any appreciable shocks which occur in the specimen. The signal generated by microphone 16 is applied to an amplifier 17 which actuates the event marker 19 to produce an effect along the length of the recording paper 42. The recording paper 42 moves through the recorder in the direction indicated by the arrow 44 at a speed bearing a known relationship to the velocity of the specimen through the transducer, and the continuous trace 46 will represent the information registered by the transducer 10 concerning a particular stand of pipe. The event marker will produce a second effect 48 along the base of the recording paper to indicate a mechanical shock, the exact nature of the effect being dependent upon the nature of the recorder but here shown as an inked spot.

Referring now to Fig. 2, the details and operation of the recorder circuit 12 will be explained. The output of the armature 32 is applied through an appropriate slip ring and brush arrangement 50 to the primary of a transformer 52. The secondary of transformer 52 has a grounded center tap and has two terminals connected to the plates of diodes 54 and 56 which form a full wave rectifier. The output of diodes 54 and 56 is a positive voltage which is applied to a filter 58 including a pair of condensers 60 and 62 and a series resistor 64. The time constant of filter 58 is selected to remove the carrier frequency, generally of the order of 200 cycles, while passing the modulation signal in the nature of a pulsating D.C. voltage having a maximum pulse rate of the order of 25 to 50 cycles. The armature 34 is connected to similar circuitry including elements 50a to 64a, differing from that just described in that the cathode of tubes 54a and 56a are connected to the transformer 52a to produce a pulsating negative voltage. The resistor 64a in the circuit associated with armature 34 is provided with a variable tap whereby the system may be calibrated to initially balance the outputs of the two armatures during inspection of a standard specimen. The outputs of filters 58 and 58a are applied to the common load resistor 66 whereby a voltage will be developed thereacross depending upon the combined voltages or voltage difference in the two armatures 32 and 34. Thus, if both armatures detect a flux change there will be equal and opposite changes in the voltage present across resistors 64 and 64a and no change in the voltage present across resistor 66.

The signal present across resistor 66 is applied through a coupling condenser 68 to a three stage audio amplifier 40. The coupling condenser 68 and first grid resistor 82 may be omitted if both transducers are always employed. The condenser 68 is necessary for D.C. blocking if a single transducer is used. The amplifier 40 includes triodes 70, 72 and 74, each connected in a conventional amplifier circuit having a plate resistor 76, a cathode resistor 78, and a cathode by-pass condenser 80. In all of the circuitry herein described, a ground symbol indicates the negative terminal of an appropriate filtered D.C. power supply and an arrowhead indicates the positive terminal thereof. Triodes 70 and 72 are also provided with a grid return resistor 82. The output of triode 70 is applied through coupling condenser 84 to the grid of tube 72 and the output of this tube is applied through coupling condenser 86 to a variable resistor 88 which comprises a gain control for the system. The signal from the wiper of resistor 88 is applied to the control grid of triode 74 through isolating resistor 90. The plate of triode 74 is directly coupled to the control grid of a triode 92 forming a part of a cathode follower circuit including a large cathode resistor 94.

The output of cathode follower 92 is applied through coupling condenser 98 to the primary of the transformer 100 and to the plate of a rectifier tube 102. The rectifier tube 102 and the associated network 101 including resistor 103 and condenser 105 provide a monitoring signal comprising positive impulses indicating the condition of the portion of the specimen under test. This may be monitored by an operator to indicate the condition of a particular section of pipe by the use of a pair of head phones, a cathode ray oscilloscope, or the like. The secondary of transformer 100 energizes a diode rectifier 104 having a load resistor 106. One terminal of the load resistor 106 is connected to a source of negative bias voltage 108 whereby the recorder will normally be energized with a negative signal to appropriately position the recorder stylus at a predetermined point along the width of the tape. It is generally found desirable to maintain the voltage at the terminal 108 at a value whereby the recorder will, under the zero signal condition, produce a trace along one edge of the tape. Thus the full width of the tape may be utilized for positive signals of maximum strength. The voltage present across resistor 106 is applied directly through isolating resistor 110 to the control grid of triode 112. The control grid of triode 112 is also connected directly to the plate of diode 114, the cathode of which is connected to a source of positive potential 116. The purpose of this diode and positive bias is to serve as a limiter to protect the recorder from excessive voltages in the following manner. If the signal applied to the grid of triode 112 exceeds the maximum which is the value of the bias voltage at terminal 116, diode 114 will begin to conduct, thus producing a voltage drop in resistor 110 and applying only the maximum signal to tube 112.

Tube 112 comprises one arm of a bridge circuit, the other arms of which include resistors 118 and 120 and gas diode 122. The recorder 114 is connected directly between the plates of tubes 112 and 122 and thus any positive excursion in the voltage on the grid of tube 112 will produce a decrease in the voltage at the plate of tube 112 and consequently the terminal 124 of the recorder 14. The other recorder terminal 126 is maintained at a constant potential, the exact potential being determined by the nature of the gas tube 122.

A circuit is thus provided in which a transducer generates a modulated alternating current voltage, the amplitude of which bears a known relationship to the magnetic character of the specimen under test. Circuitry is provided which removes the alternating signal generated by the transducer and amplifies a signal representative of the amplitude of the voltage envelope. This signal, after passage through various coupling condensers, is in the nature of a sine wave and is therefore rectified, the positive half cycle being applied to the recorder 14 to produce an effect therein representative of the condition of the specimen.

The details of the microphone circuit shown in Fig. 1 are illustrated in Fig. 3. Therein a coil 128 forming a part of the microphone 16 is connected to the control grid of a pentode 130. Pentode 130 forms a part of a conventional amplifier circuit including plate resistor 132, screen network 134 including resistor 136 and condenser 138, cathode resistor 140 and cathode condenser 142. The output of pentode 130 is applied through coupling condenser 144 to a potentiometer 146, serving as a gain control, the wiper of which is directly connected to the control grid of triode 148. Triode 148 is a part of an amplifier circuit including cathode resistor 150 and plate resistor 152. The output of triode 148 is applied through coupling condenser 154 to the plate of rectifying diode 156. The cathode of diode 156 is connected to the grid of a second triode 158. The diode 156 removes the negative half cycle from the signal applied thereto and passes the positive half cycle which produces a positive voltage across the network comprising a resistor 160 and a condenser 162. The output of triode 158 energizes a relay coil 164 in the plate circuit thereof for each positive impulse of predetermined magnitude. A resistor 167, in the cathode circuit of triode 158, is connected in series with a resistor 169 which is connected to the positive D.C. supply. This will normally maintain the grid of tube 158 at a substantially negative voltage relative to the cathode and thus the tube will normally be operating below cut-off. The purpose of the positive bias on the cathode of triode 158 is to prevent conduction for grid voltage impulses below a predetermined level. Thus, no current will flow in the coil 164 unless the grid voltage impulse is of a substantial predetermined magnitude. If such a bias system were not provided spurious noises and vibration would be recorded by the event marker. This would be misleading and would obscure the desired data. The coil 164 when energized attracts a movable contact 166 to complete a circuit between a source of positive voltage indicated by arrow 168 and the recorder 14. This will produce an effect upon the record paper as described above and will indicate to an operator that a correspondingly aligned effect in the record of the magnetic characteristic of the specimen will represent a sonic or stress impulse and not a discontinuity or flaw in the specimen.

A sample of the record produced by this apparatus is reproduced in Fig. 4. Therein the record paper 42 is shown bearing a preprinted grid 170 to expedite the interpretation of the trace 46 which represents the information concerning a particular length of drill pipe. The substantial excursions 172, 174, 176 and 178 extending transversely from the datum and grouped as two spaced pairs indicate the passage of a pipe joint through the transducer and these effects may therefore be ignored in determining the condition of the pipe, though they are useful for identifying the length of pipe under test. The transverse excursion 180 might indicate a potential flaw in the drill pipe except that it is accompanied by an effect 182 produced by the event marker 20 and indicative of a percussive blow or mechanical disturbance. The transverse effect 184 might represent a potential fracture in the pipe or at least excessive pitting at that point in the length of the pipe and such an indication would require additional investigation by the operator.

One particular transducer found well adapted for use in this invention is shown in Figs. 5–11. Referring particularly to Fig. 5 the transducer 186 comprises a mounting ring 188 adapted for attachment to a drilling nipple, a plurality of vertical supports 218 mounted for universal movement on said mounting ring, a pair of pole pieces 190 and 192 mounted on the supports 218, a stripper ring 194 supported below the pole pieces, a plurality of magnetic shoes 196 radially slidable relative to the pole pieces 190 and 192 and mounted for movement on plungers 198 and 199 mounted in housings 197, a plurality of motor-armature units 201 rotatably mounted between pole pieces 190 and 192, and a magnetic coil 200 (shown in dotted lines) mounted on an aluminum support 202 above the pole piece 192. A specimen 204 is shown in dotted lines extending through the transducer to clearly illustrate the operation of this apparatus.

The mounting ring 188, magnet cup 202, stripper 194, and pole pieces 190 and 192 are all formed as two semiannular members to facilitate installation, handling and removal of the device. The mounting ring 188 is formed in two halves 206 and 208 pivotally connected at one free end by a link 210 and clamped to the drilling nipple to form a complete annulus by the nuts 211 and bolt 212 extending through a pair of eyes 214 and 216 mounted at the free ends of members 206 and 208. The plurality of supporting arms 218 are coupled to ring 188 by ball and socket joints 220. The joints 220 permit motion of the arms 218 up to 60° in all directions from the vertical and thus the pole pieces 190 and 192 which are mounted to the other ends of supports 218 through similar ball and socket joints 222 are free to move transversely through a substantial distance from the normal vertical alignment with the ring 188. A turnbuckle 221 is provided in each support 218 whereby the pole pieces may be adjusted to be perfectly normal to the axis of the specimen. It is found that in withdrawing drilling pipe from a well, substantial transverse movement is encountered and if a flexible mounting were not provided damage to the transducer would result and the intimate magnetic contact provided by this invention would be lost. By the universal mounting described, the pole pieces will remain horizontal and will follow the specimen though it shifts transversely.

The pole pieces 190 and 192, plungers 198, and portions of shoes 196 are of a low retentivity magnetic material having substantial strength and rigidity and in one particular embodiment of this invention 1020 hot rolled steel was found well adapted for this use. The pole pieces are maintained in spaced relationship by two flat annular aluminum inserts 224 and the laminated annulus is secured together by bolts 225. The two portions of the laminated pole assembly are hinged together at adjacent free ends by a bronze hinge 226 and are locked to form a complete annulus by a hasp 228 also formed of bronze or other nonmagnetic material. The locking means taught by this invention includes a latch member 230 engageable by a link 232 which is pivotally mounted on a handle 234 adapted to produce toggle motion of the link 232. The hasp 228 and hinge 226 also provide magnetic insulation between the two semiannular pole pieces whereby they may function independently without interaction therebetween. The magnet cup 202 is formed in halves which are supported above the pole piece 190 on bronze stanchions 203 whereby the coil 200 and the pole pieces will at all times be concentric. The stripper plate 194 is similarly suspended below the lower pole piece 192 by stanchions 193 in spaced concentric relationship thereto. An annular stripper of flexible material (not shown) is secured to plate 194 to remove the mud and abrasives which are drawn up with the specimen. The wear on the various sliding parts and especially the pole shoes 196 is thereby reduced.

Each of the shoes 196 is pivotally mounted on an aligned vertical pair of the plungers 198 and 199, the first of which is mounted in the upper pole pieces 190 and the second of which is mounted in the lower pole piece 192, as best illustrated in Figs. 9 and 10. The plungers 198 and 199 are continuously urged toward the central axis of the transducer by coil springs 250. Fig. 9 illustrates a single shoe 196 in engagement with the specimen 204. The shoe 196 is composed of two angularly disposed portions 236 and 238 of a magnetic material which are brazed or similarly formed integrally with a central nonmagnetic insert 240. The portion 238 of the shoe is connected to the lower plunger 199 by a pin 244 extending through appropriate apertures formed in the shoe and plunger. In a similar manner a steel pin 242 connects the shoe portion 236 to the upper plunger 198. However, a slotted aperture 246 is formed in the shoe portion 236 to provide motion of the shoe relative to the plunger, the need for which will be clear from a consideration of Fig. 10. The plungers 198 and 199 are slidable in housings 197 and are normally urged toward the specimen by the helical springs 250 compressed between the outer end of the plunger and caps 252 which threadably engage the outer ends of housings 197. The motion of plungers 198 and 199 are limited by stops 254 which threadably engage the pole pieces 190 or 192 extending through the housings 197 into elongated slots 257 formed in the plungers 198 and 199. Thus it is believed clear that an intimate magnetic circuit is, at all times, completed from the upper portion of the specimen 204 through the upper portion 236 of the shoe 196, the plunger 198, the upper pole piece 190, the lower pole piece 192, the lower plunger 199 and the lower shoe portion 238 to the area on the specimen 204 immediately adjacent said lower shoe portion. A generator armature, not shown, is disposed between the pole pieces 190 and 192 and also forms a part of the magnetic circuit.

If a flaw of any sort exists in the specimen in the area immediately adjacent the insert 240 it is believed manifest that the reluctance of the specimen at that point increases and the flux in the magnetic path just described will be increased. Thus by rotating the armature disposed between the pole pieces, the armature will cut a number of flux lines dependent upon the character of the specimen and produce a signal indicative thereof.

When a pipe joint is encountered in the specimen such as joint 256 of Figs. 9 and 10 and the pipe is moving in the direction of the arrow 248 the shoe will initially be urged to the position shown in Fig. 10 whereby the plunger 199 is forced outwardly compressing the associated helical spring and permitting the specimen to ride therethrough. As the specimen proceeds the entire shoe will be forced outwardly as shown by dotted lines 258 of Fig. 9 and the shoe will remain in that position until the joint or other protuberance passes the center point of the shoe. At the instant the end of the joint passes the center point, the plunger 199 will urge the lower portion 238 of the shoe inwardly into engagement with the body of specimen 204.

Figs. 8 and 11 indicate the manner in which the armatures 32 and 34 are mounted between the pole pieces 190 and 192. The armature 32 may have any desired number of poles thereon, the number of poles determining the frequency of the signal generated for a given armature speed. The armature is mounted between the pole pieces on appropriate bearings 258 and 260 and is driven by an appropriately energized electric motor 262. Appropriate means such as brushes and slip rings for removing the generated voltage from the armature must be provided, though not illustrated in Fig. 11.

An alternate embodiment of this invention is disclosed in Figs. 12 and 13. This embodiment is adapted for determining the character of drill pipe already removed from a drilling operation and stored, preferably in a horizontal position. The transducer 264 is adapted to energize circuitry and a recorder identical to those employed with the transducer above described.

The transducer 264 employs a pair of pole pieces 266 and 268 maintained in spaced relationship by an aluminum spacer 270 and includes a longitudinally spaced magnetizing coil 272 mounted on a base 288. However, as no pipe joints will be encountered in this mode of testing it is possible to employ a simplified shoe construction utilizing a plurality of shoes 274 adjustably secured in the pole piece 266 and a similar set of shoes 276 adjustably secured in the pole piece 268. The shoes may be held in place by an appropriate clamp 267. As in the embodiment described above the entire assembly is split whereby it may be readily assembled on the specimen and utilized to energize two independent circuits. The use of two similar circuits to generate substantially equal signals which may be compared results in the elimination of steady state errors resulting from changes in the character of the material or the variations in the total flux present in the specimen. A pair of armatures (not shown) are employed in this embodiment, each disposed between adjacent halves of the pole pieces 266 and 268 and coaxially mounted with associated motors 278 and 280 for rotation thereby. The transducer 264 is provided with a plurality of rollers 282 rotatably secured to the pole piece 268 and the base 288 and adapted to engage the specimen whereby the transducer may readily be moved along the length of the fixed specimen. A chain 284 or other similar means is provided for engagement with a driving means 290 which will move the transducer along the length of the specimen 286 at a generally uniform predictable rate. The mounting means 288 adapted to receive the magnetizing coil 272 is formed of a nonmagnetic material such as aluminum whereby it produces no interference with the magnetic field produced in specimen 286.

An alternate amplifier input circuit is illustrated in Fig. 14. Therein the armatures 32 and 34 energize identical rectifier circuits including transformers 52 and 52a and diodes 54, 56 and 54b, 56b. For a good specimen substantially equal positive voltages filtered by networks 58 and 58a will appear across resistors 57 and 59 and these voltages are applied to independent gain controls 292 and 294 through coupling condensers 296 and 298. If either transducer detects a flaw, it will appear as a change of voltage on its respective load resistor 57 or 59. These voltages are applied to the grids of amplifier tubes 300 and 302 through the upper portions of potentiometers 304 and 306 for normal operation. As will be explained, a switch 67 is provided having normally open contacts 308 and 310 between one terminal of potentiometers 304 and 306 respectively, and ground. When switch 67 is operated, the gain of the amplifiers is greatly reduced, the reduction depending upon the position of the potentiometer wipers, producing a minimum excursion of the recorder trace. This is found necessary where the effect of pipe joints and the like are not eliminated by the differential input circuit. The outputs of the amplifiers are connected in parallel relationship whereby the excursions are additive, and the total voltage is applied to circuitry similar to that already described with respect to Fig. 2.

Switch 67 is diagrammatically shown in Figs. 9 and 10 in association with the lower plunger 199. The control button 71 of switch 67 normally rests in a slot 69 formed in plunger 199, permitting the normally closed switch to remain closed. Upon encountering a pipe joint, the plunger is shifted whereby the switch 67 is opened, as shown in Fig. 10, thus greatly reducing the recording signal and protecting the recorder from excessive excursions which otherwise may result from large surface discontinuities.

It will be clear that various components, speeds, fluxes and the like may be employed, the exact nature thereof depending upon the specimen and test conditions. However, in the embodiments described, it is anticipated that the transducer will be moved along the length of the specimen at a velocity of approximately two feet per second. It has been found that this is the normal rate at which drill pipe is withdrawn from a well. The spacing of the magnetic portions of the shoes determines the period of time during which a discontinuity or flaw may be detected. In the embodiments described a ½ inch shoe spacing was employed and therefore the signal corresponding to the discontinuity will persist for approximately $\frac{1}{48}$ of a second. The amplifier and associated circuitry must be designed to accommodate a pulse rate of 48 cycles per second. Furthermore, if the filters for removing the carrier signal are to function properly the speed of lengthwise movement of the specimen must be maintained within limits determined by the carrier frequency in order that the carrier and modulation will be distinguishable from one another. If, for example, a 9000 r.p.m. four pole motor is utilized to drive the armature, the output frequency will be about 300 cycles and the filters 58 may readily be designed to isolate the 48 cycle intelligence.

While any source of magnetic flux will be satisfactory for the operation of the equipment and performance of the testing method described by this invention the particular coil utilized in the embodiments described comprises 550 turns of No. 12 wire carrying approximately four amperes and resulting in a magnetizing force of 2200 ampere turns. While an event marker is included in this embodiment to clearly distinguish sonic and stress effects, this circuit may be omitted in many applications where operational technique will eliminate any misleading shock effect from the recording.

While two embodiments have been described in this disclosure it is believed clear that an entirely new concept in magnetic testing is taught hereby. Various constructions may be conceived which will abstract a portion of the flux in a specimen and use this abstracted flux as the field of a signal generator whereby the magnetic character of the specimen may be determined and various modifications of the transducer taught by this invention will occur to one skilled in the art but all such modifications and alternate embodiments are believed to be clearly within the spirit and scope of this invention.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. Apparatus for inspecting an elongated specimen of magnetic material comprising means for generating a substantially constant magnetic flux in such specimen along the axis thereof, a pair of annular magnetic pole pieces, means supporting said pole pieces in axially spaced magnetically isolated relationship, magnetic shoe means extending from said pole pieces, resilient means yieldably urging said shoe means toward the axis of said pole pieces to engage such specimen, and armature means rotatably mounted between said pole pieces to generate a voltage therein corresponding to the magnetic character of the portion of said specimen disposed between said shoe means.

2. Apparatus for inspecting an elongated specimen of magnetic material comprising two pairs of semi-annular magnetic pole pieces, means supporting each pair in spaced magnetically isolated overlying relationship, said pairs being secured together and magnetically isolated to form two complete annuluses, and armature means rotatably mounted between the pole pieces of each pair.

3. Apparatus for inspecting an elongated specimen of magnetic material comprising two pairs of semi-annular magnetic pole pieces, means supporting each pair in spaced magnetically isolated overlying relationship, said pairs being secured together and magnetically isolated to form two complete annuluses, armature means rotatably mounted between the pole pieces of each pair, and power means for rotating said armatures at predetermined speeds.

4. Apparatus for inspecting an elongated specimen of magnetic material comprising two pairs of semi-annular magnetic pole pieces, means supporting each pair in spaced magnetically isolated overlying relationship, said pairs being secured together and magnetically isolated to form two complete annuluses, magnetic shoe means slidably mounted in each of said pole pieces, resilient means yieldably urging said shoe means toward the axis of said pole pieces, armature means rotatably mounted between the pole pieces of each pair, and power means for rotating said armatures at predetermined speeds.

5. Apparatus for inspecting an elongated specimen of magnetic material comprising a laminated apertured pole member having two magnetic laminae and an intermediate nonmagnetic lamina, the aperture therein being adapted to receive such specimen, a plurality of magnetic plungers slidably mounted in each of said magnetic laminae and in communication with the aperture therein, the plungers in said two laminae being axially aligned to form pairs, spring means urging said plungers into the aperture, and shoe means pivotally secured to each of said pair of plungers, said shoe means comprising two magnetic end portions, each secured to one of said plungers, and an integral nonmagnetic central portion.

6. Apparatus for inspecting an elongated specimen of magnetic material comprising a laminated apertured pole member having two magnetic laminae and an intermediate nonmagnetic lamina, the aperture therein being adapted to receive such specimen, said pole member being transversely apertured, an armature rotatably mounted in each transverse aperture, said armature having a magnetic core with a conductor wound thereon, said armature magnetically coupling said magnetic laminate, a plurality of magnetic plungers slidably mounted in each of said magnetic laminate and in communication with the aperture therein, the plungers in said two laminae being axially aligned to form pairs, spring means urging said plungers into the aperture, and shoe means pivotally secured to each of said pair of plungers, said shoe means comprising two magnetic end portions, each secured to one of said plungers, and an integral nonmagnetic central portion.

7. Apparatus for inspecting an elongated specimen of magnetic material comprising means for generating an axial magnetic flux in such specimen, a laminated apertured pole member having two magnetic laminae and an intermediate nonmagnetic lamina, the aperture therein being adapted to receive such specimen, said pole member being transversely apertured, an armature rotatably mounted in each transverse aperture, said armature having a magnetic core with a conductor wound thereon, said armature magnetically coupling said magnetic laminae, a plurality of magnetic plungers slidably mounted in each of said magnetic laminae and in communication with the aperture therein, the plungers in said two laminae being axially aligned to form pairs, spring means urging said plungers into the aperture, and shoe means pivotally secured to each of said pair of plungers, said shoe means comprising two magnetic end portions, each secured to one of said plungers, and an integral nonmagnetic central portion.

8. Apparatus for inspecting an elongated axially movable specimen of magnetic material comprising an annular base member, a plurality of supports mounted on said base member, a laminated apertured pole member mounted on said supports, said pole member having two magnetic laminae and an intermediate nonmagnetic lamina, the aperture therein being aligned with the annular base to receive such specimen therethrough, said plurality of supports being connected to said base and said pole member to permit transverse movement therebetween, said pole member being transversely apertured, an armature rotatably mounted in each transverse aperture, said armature having a magnetic core with a conductor wound thereon, said armature magnetically coupling said magnetic laminae, a plurality of magnetic plungers slidably mounted in each of said magnetic laminae and in communication with the aperture therein, the plungers in said two laminae being axially aligned to form pairs, spring means urging said plungers into the aperture, and shoe means pivotally secured to each of said pair of plungers, said shoe means comprising two magnetic end portions, each secured to one of said plungers, and an integral nonmagnetic central portion.

9. Apparatus for inspecting an elongated axially movable specimen of magnetic material comprising an annular base member, a plurality of supports mounted on said base member, a laminated apertured pole member mounted on said supports, said pole member having two magnetic laminae and an intermediate nonmagnetic lamina, the aperture therein being aligned with the annular base to receive such specimen therethrough, said plurality of supports being connected to said base and said pole member to permit transverse movement therebetween, said base member and said pole member being split into two hingedly connected semi-annular portions, latch means for securing said hingedly connected portions together, said pole member being transversely apertured, an armature rotatably mounted in each transverse aperture, said armature having a magnetic core with a conductor wound thereon, said armature magnetically coupling said magnetic laminae, a plurality of magnetic plungers slidably mounted in each of said magnetic laminae and in communication with the aperture therein, the plungers in said two laminae being axially aligned to form pairs, spring means urging said plungers into the aperture, and shoe means pivotally secured to each of said pair of plungers, said shoe means comprising two magnetic end portions, each secured to one of said plungers, and an integral nonmagnetic central portion.

10. Apparatus for inspecting an elongated specimen of magnetic material comprising two semi-annular base members, bearing means mounted on the inner surface of said base members for movement along such specimen, means to secure said base members together to enclose said specimen, means for moving said apparatus longitudinally along said specimen, a source of longitudinal magnetic flux mounted on said base, two longitudinally spaced semi-annular magnetic pole pieces in abutment with said specimen, means supporting said pole pieces in spaced, magnetically isolated relationship on said base members longitudinally spaced from said flux source, and an armature rotatably mounted between said pole pieces, said armature and pole pieces comprising a flux sensing transducer.

11. Apparatus for inspecting an elongated specimen of magnetic material comprising two annular pole pieces mounted in spaced, magnetically isolated, overlying relationship, a plurality of shoes extending inwardly from said pole pieces, the inward ends thereof being in juxtaposition with such specimen, armature means rotatably mounted between said pole pieces, power means for rotating said armature means at predetermined speeds, and a source of constant magnetic flux mounted in fixed spaced relationship to said pole pieces.

12. Apparatus for inspecting an elongated specimen of magnetic material comprising two annular pole pieces mounted in spaced, magnetically isolated, overlying relationship and having their inner peripheries adjacent to said specimen, armature means rotatably mounted between said pole pieces, power means for rotating said armature means at predetermined speeds, and a source of constant magnetic flux mounted in fixed spaced relationship to said pole pieces.

13. Apparatus for inspecting an elongated specimen of magnetic material comprising a pair of annular magnetic pole pieces, means supporting said pole pieces in spaced magnetically isolated overlying relationship, said pole pieces being secured together and magnetically isolated to form two complete annuluses, and armature means rotatably mounted between the pole pieces.

References Cited in the file of this patent

UNITED STATES PATENTS

| | | |
|---|---|---|
| 1,685,965 | Spooner | Oct. 2, 1928 |
| 1,892,826 | Bettison et al. | Jan. 3, 1933 |
| 2,067,804 | Thorne | Jan. 12, 1937 |
| 2,435,985 | Stewart et al. | Feb. 17, 1948 |
| 2,508,494 | Cook et al. | May 23, 1950 |
| 2,650,344 | Lloyd | Aug. 25, 1953 |